(12) United States Patent
Beddus et al.

(10) Patent No.: US 12,425,488 B2
(45) Date of Patent: Sep. 23, 2025

(54) METHOD OF OPERATING A TELECOMMUNICATIONS NETWORK

(71) Applicant: BRITISH TELECOMMUNICATIONS PUBLIC LIMITED COMPANY, London (GB)

(72) Inventors: Simon Beddus, London (GB); Claudia Cristina, London (GB); Fadi El-Moussa, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/552,636

(22) PCT Filed: Feb. 22, 2022

(86) PCT No.: PCT/EP2022/054362
§ 371 (c)(1),
(2) Date: Sep. 26, 2023

(87) PCT Pub. No.: WO2022/207192
PCT Pub. Date: Oct. 6, 2022

(65) Prior Publication Data
US 2024/0171654 A1 May 23, 2024

(30) Foreign Application Priority Data
Mar. 30, 2021 (GB) .................... 2104476

(51) Int. Cl.
*H04L 67/564* (2022.01)
*H04L 67/60* (2022.01)

(52) U.S. Cl.
CPC ............ *H04L 67/564* (2022.05); *H04L 67/60* (2022.05)

(58) Field of Classification Search
None
See application file for complete search history.

(56) References Cited

U.S. PATENT DOCUMENTS

| | | |
|---|---|---|
| 10,581,690 B2 | 3/2020 | Salgueiro et al. |
| 10,601,664 B2 | 3/2020 | Kumar et al. |
| (Continued) | | |

FOREIGN PATENT DOCUMENTS

| | | |
|---|---|---|
| EP | 0915594 A2 | 5/1999 |
| EP | 3313118 A1 | 4/2018 |
| (Continued) | | |

OTHER PUBLICATIONS

What is MUD—Manufacturer Usage Description—Document—Cisco DevNet, https://developer.cisco.com/docs/mud/#!what-is-mud, 2021 Cisco DevNet (2 pages).
(Continued)

*Primary Examiner* — June Sison
(74) *Attorney, Agent, or Firm* — Nixon & Vanderhye P.C.

(57) ABSTRACT

Method of Operating a Telecommunications Network A computer-implemented method (200) of operating a telecommunications network (100), the telecommunications network comprising a client device (110) and a server (140), wherein the server and the client device are connected via an access point (120), the method comprising the steps of: receiving a service request from the client device, said service request requesting a service from the server (310); identifying client device characteristic information associated with the client device (340); identifying service requirement information associated with the requested service (330); comparing the identified client device characteristic information with the identified service requirement information so as to determine if the client device information complies with the service requirement information (350); and in response to said comparison: permitting the server to
(Continued)

provide the requested service in accordance with the service request if the client device information complies with the service requirement information (370); and preventing the server from providing the requested service in accordance with the service request if the client device information does not comply with the service requirement information (380).

13 Claims, 2 Drawing Sheets

(56) References Cited

U.S. PATENT DOCUMENTS

| | | | |
|---|---|---|---|
| 2010/0325215 | A1 | 12/2010 | De et al. |
| 2013/0007129 | A1 | 1/2013 | German et al. |
| 2015/0188949 | A1 | 7/2015 | Mahaffey et al. |
| 2016/0373344 | A1 | 12/2016 | Wohlert |
| 2017/0126692 | A1* | 5/2017 | Stuntebeck ............ G06F 3/0481 |
| 2017/0366646 | A1* | 12/2017 | Bradley .............. H04L 63/0823 |
| 2019/0253319 | A1 | 8/2019 | Kampanakis et al. |
| 2019/0260751 | A1 | 8/2019 | Kale et al. |
| 2019/0311134 | A1 | 10/2019 | Mahaffey et al. |
| 2019/0319953 | A1 | 10/2019 | Lear et al. |
| 2020/0136991 | A1 | 4/2020 | Salgueiro et al. |
| 2020/0137119 | A1 | 4/2020 | Jin et al. |
| 2020/0242222 | A1 | 7/2020 | Machani et al. |
| 2021/0367839 | A1* | 11/2021 | Vanderveen ........ H04L 41/0894 |

FOREIGN PATENT DOCUMENTS

| | | |
|---|---|---|
| GB | 2506309 A | 3/2014 |
| GB | 2544049 A | 5/2017 |
| WO | 2020118377 A1 | 6/2020 |

OTHER PUBLICATIONS

Combined Search and Examination Report under Sections 17 and 18(3) dated Apr. 13, 2022 issued for Application No. GB2115948.8 (9 pages).
Fortinet, Data Sheet FortiNAC 500C, 550C, 600C, 700C, VM, and Licenses, 2019 Fortinet, Inc. (10 pages).
Combined Search and Examination Report under Sections 17 and 18(3) dated Nov. 26, 2021 issued for Application No. GB2104476.3 (10 pages).
International Search Report and Written Opinion of the ISA dated Feb. 10, 2023, issued for International Application No. PCT/EP2022/078837 (14 pages).
International Search Report and Written Opinion of the ISA dated Jun. 17, 2022, issued for International Application No. PCT/EP2022/054362 (15 pages).
Ayyoob Hamza et al., "Verifying and Monitoring IoTs Network Behavior using MUD Profiles", IEEE Transactions on Dependable and Secure Computing, 2020 (17 pages).
CISCO, "Visibility and Segmentation: first steps to securing Industrial Networks", Francesca Martucci—Technical Solutions Architect, CyberSecurity—EMEAR, CISCO Live, Barcelona, Jan. 27-31, 2020 (96 pages).
Ayyoob Hamza et al., "Detecting Volumetric Attacks on IoT Devices via SDN-Based Monitoring of MUD Activity", SOSR '19, Apr. 3-4, 2019, San Jose, CA, USA (13 pages).
Markus Miettinen et al., "IOT Sentinel: Automated Device-Type Identification for Security Enforcement in IoT", arXiv:1611.04880v2 [cs.CR] Dec. 13, 2016 (11 pages).
International Preliminary Report on Patentability dated May 16, 2024, issued for International Application No. PCT/EP2022/078837 (9 pages).
Communication under Rule 71(3) EPC dated Oct. 11, 2024, issued for European Application No. 22 712 262.9 (7 pages).

* cited by examiner

METHOD OF OPERATING A TELECOMMUNICATIONS NETWORK

CROSS-REFERENCE TO RELATED APPLICATIONS

This application is the U.S. national phase of International Application No. PCT/EP2022/054362 filed Feb. 22, 2022, which designated the U.S. and claims priority to GB 2104476.3 filed Mar. 30, 2021, the entire contents of each of which are hereby incorporated by reference.

FIELD OF INVENTION

The present invention relates to a method of operating a telecommunications network, and in particular to a method for reconciling provision of a network service to a client device based on identified characteristics of said client device.

BACKGROUND

The "Internet of Things" (IoT) grants connectivity to traditionally non-networked devices, such as sensors (e.g. temperature or optical). Some applications of IoT devices include people counting (i.e. footfall measurement), monitoring of vehicular traffic, air quality analysis, temperature and other environmental measurement, and control systems for streetlights or vehicular traffic signals.

The number of IoT devices that are being connected to each other and to the "Cloud" over the Internet is estimated to be in the tens of billions. Furthermore, the use of IoT devices, and in particular for sensing the environment, is growing. Many of these IoT devices have low processing power (and are, for example, based around a Raspberry Pi®, a small factor PC or an Application-Specific Integrated Circuit). Accordingly, IoT devices typically transmit their data to a nearby gateway (small computer) that has more compute, battery and/or network resources and which is then responsible for communicating the data on to a remote server for providing a service for that data (e.g. storing, processing and/or responding) by means an application operating on the remote server.

As a result of the relatively rudimentary nature of IoT devices, IoT devices (especially those that operate in public areas) are prone to compromise by means of a malicious attack. Known malicious attacks include: denial of service; man-in-the-middle; malware; and botnets. For example, malware may be introduced as part of a malicious attack on a network or even by way of physical tampering. A single compromised device can then spread malware to adjoining devices and even devices in other networks resulting in attacks being replicated across multiple networks very quickly. Beyond malicious attacks, poor design and/or malfunction of an IoT device can also cause an IoT device to be compromised in a way that causes detriment to a network.

However, identifying when an IoT device has been compromised may be a difficult endeavour. In part, this difficulty may arise because identifying when an IoT device has been compromised may first require an understanding of how the IoT device should operate when uncompromised. In turn, determining how each type of IoT device should normally operate may require significant processing.

It is an aim of the present invention to at least alleviate some of the aforementioned problems.

STATEMENTS OF INVENTION

According to a first aspect of the present invention, there is provided: a computer-implemented method of operating a telecommunications network, the telecommunications network comprising a client device and a server (preferably, the server and the client device are connected via an access point), the method comprising the steps of: receiving a service request from the client device, said service request requesting a service from the server; identifying client device characteristic information associated with the client device; identifying service requirement information associated with the requested service; comparing the identified client device characteristic information with the identified service requirement information so as to determine if the client device information complies with the service requirement information; and in response to said comparison: permitting the server to provide the requested service in accordance with the service request if the client device information complies with the service requirement information; and preventing the server from providing the requested service in accordance with the service request if the client device information does not comply with the service requirement information.

Accordingly, provision of the service to the client may be performed only when the client device characteristic information match (or exceed) the service requirement information.

Preferably, the client device characteristic information comprises pre-defined information provided by the client device. Optionally, the pre-defined information is provided directly by the client device or by a remote network resource identified by the client device.

Preferably, the pre-defined information is contained in a Manufacturer Usage Description file.

Preferably, identifying the client device characteristic information further comprises the steps of: monitoring network communications with the client device; compiling a behaviour profile for the client device in dependence on said network communications, wherein the client device characteristic information comprises the behaviour profile. Preferably, the behaviour profile is updated in response to performing analysing of a network communication from the client device.

Preferably, the client device characteristic information comprises a classification of the type of client device.

Preferably, the client device characteristic information comprises a classification of the type of data generated by the client device.

Preferably, the client device characteristic information comprises network connection characteristics of the client device. Preferably, the network connection characteristics include a: communication protocol; security protocol; type of network connection; network communication metrics, for example bandwidth, latency, and/or jitter. Preferably, the network communication metrics include: volume of traffic; frequency of communications; network communication protocol; and security protocol.

Preferably, the service requirement information is a rule requiring specific client device characteristic information of the client device. Preferably, said rule comprises a specification, limit, threshold, and/or range. Preferably, the rule relates to a network connection characteristic. Preferably, the rule relates to a network communication metric. Preferably, the rule relates to a classification of the type of data generated by the client device. Preferably, the rule relates to a classification of the type of client device.

Preferably, in response to preventing the server from providing the service, the method further comprising the steps of: identifying a characteristic of the client device characteristic information that is non-compliant with the service requirement information; identifying a reconfiguration for modifying the client device and/or the network connection between the client device and the server thereby to render the characteristic compliant with the requirement information; and implementing said identified reconfiguration.

Preferably, the reconfiguration comprises implementing a security policy.

Preferably, the reconfiguration comprises modifying the network connection between the client device and the telecommunications network (specifically the server), and more preferably, modifying an access technology and/or changing an access point.

Preferably, modifying the network connection comprises changing a routing policy for network communications associated with the client device, and more preferably, providing a new network path for said network communications.

Preferably, the reconfiguration comprises modifying the client device. Preferably, said modifying comprises providing new software. Preferably, the reconfiguration comprises modifying a network entity through which the client device is connected to the server. Preferably, said network entity is a/an: gateway; further server; access point; switch; router; modem; firewall; VPN; and/or network function.

According to another aspect of the invention, there is provided a computer-readable carrier medium comprising a computer program, which, when the computer program is executed by a computer, causes the computer to carry out the method as described above.

According to yet another aspect of the invention, there is provided a client device, the telecommunications network comprising: a server, to which the client device is connected via an access point; a receiver configured to receive a service request from the client device, said service request requesting a service from the server; a processor configured to: identify client device characteristic information associated with the client device; identify service requirement information associated with the requested service; compare the identified client device characteristic information with the identified service requirement information so as to determine if the client device information complies with the service requirement information; and in response to said comparison: permit the server from providing the requested service in accordance with the service request if the client device information complies with the service requirement information; and prevent the server from providing the requested service in accordance with the service request if the client device information does not comply with the service requirement information.

Optionally, processor is provided as part of an edge device through which the client device is connected to the server.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

The invention also provides a method of transmitting a signal, and a computer product having an operating system that supports a computer program for performing any of the methods described herein and/or for embodying any of the apparatus features described herein.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of operating a telecommunications network and a telecommunications network as described herein and/or substantially as illustrated with reference to the accompanying drawings. The present invention is now described, purely by way of example, with reference to the accompanying diagrammatic drawings, in which.

SPECIFIC DESCRIPTION

Figure 1:
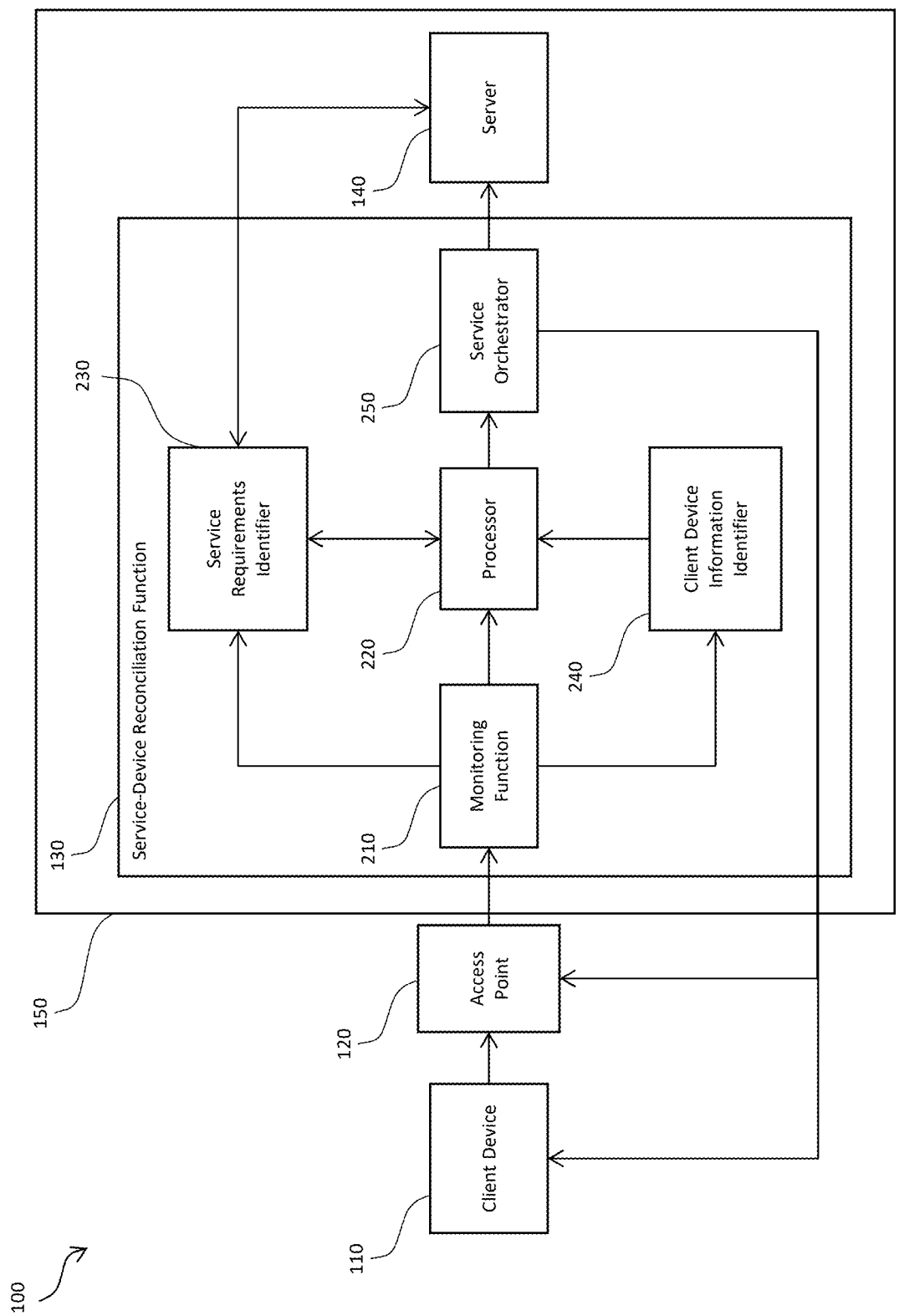
FIG. 1 shows a telecommunications network.

FIG. 1 shows an exemplary telecommunications network 100, which comprises a/an: client device 110; Access Point (AP) 120; Service-Device Reconciliation Function (SDRF) 130; and sever 140.

The client device 110 is available communicatively to connect with the AP 120, which in turn is configured to provide the client device with access to a wide area network 150, within which the SDRF 130 and the server 140 are provided.

The client device 110 is available to be in the form of: a personal computer (laptop or desktop); mobile telecommunications device; or Internet of Things (IOT) device. The AP is available to be a wireless or wired access point, and provide a local area network (e.g. by means of Wi-Fi, Bluetooth, ZigBee, etc.) and/or cellular connectivity. The AP is available to comprise a router, modem and/or network gateway.

The server 140 is configured to provide a service for the client device 110, upon receipt of a service request from the client device. Services that are available to be provided by the server include data processing (e.g. storage, transfer, analysis, manipulation, transformation, packet inspection, etc.) and a network service (e.g. routing, network configuration, security function, etc.). Services are available to be provided by applications running on the server.

As shown in FIG. 1, the SDRF 130 in turn comprises a: Monitoring Function (MF) 210; processor 220; Service Requirement Identifier (SRI) 230; Client Device Information Identifier (CDII) 240; and service orchestrator 250. The SDRF is arranged in-line with user traffic that flows between the client device 110 and the server, thereby to intercept and to process such traffic.

In overview, the SDRF 130 is configured to intercept a service request from the client device 110 and then to permit or to deny that service request in dependence on both the characteristics of the service request and of the client device 110.

Figure 2:
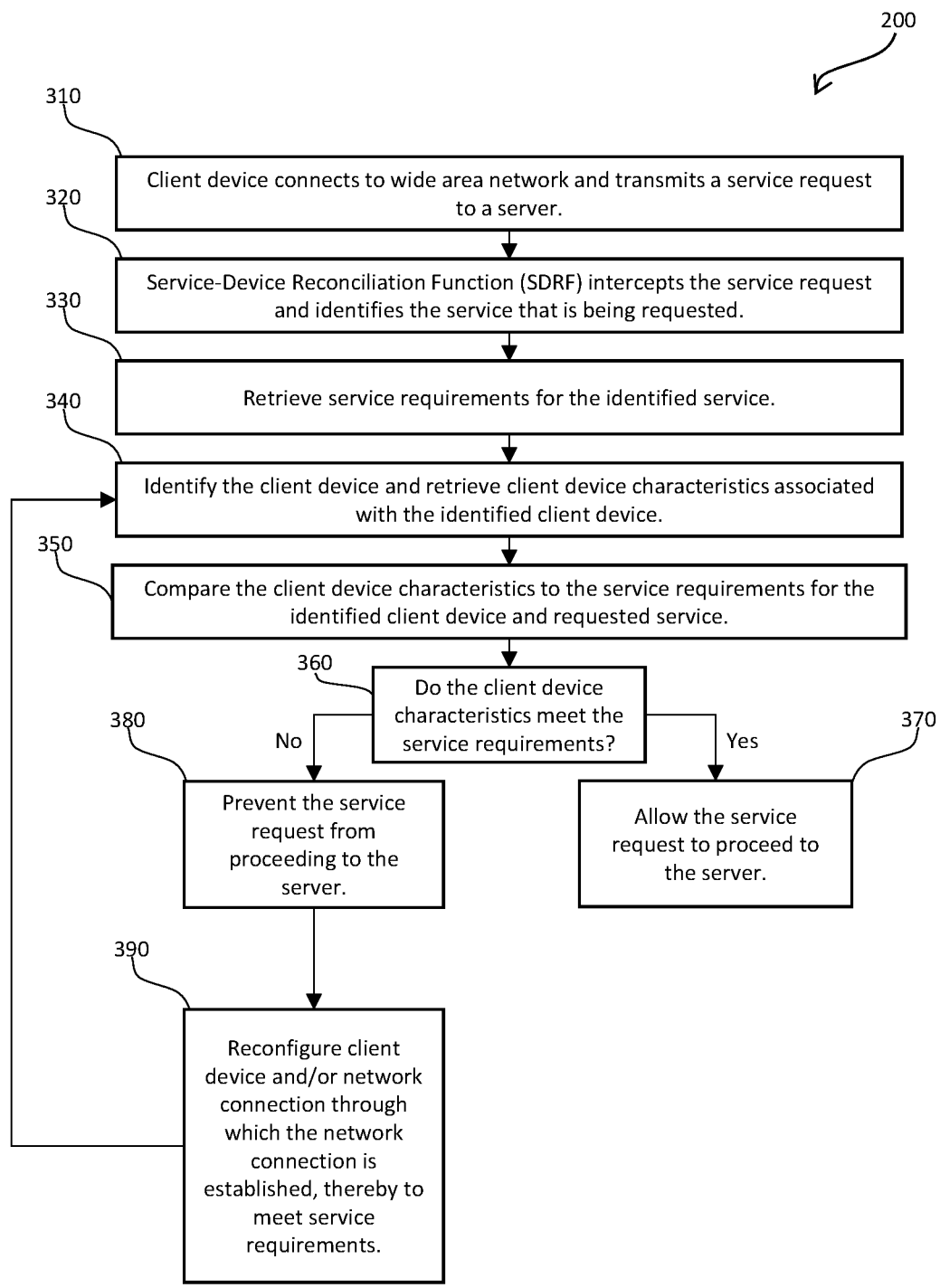
FIG. 2 shows a process for operating the telecommunications network.

FIG. 2 shows an exemplary process 200 for operating the telecommunications network 100.

At a first step 310, the client device 110 establishes a connection with the wide area network 150, via the AP 120. In this way, the client device may communicate with the server 140. The client device subsequently communicates a service request so as to request a service from the server.

At a next step 320, prior to the server 140 receiving the service request (and in particular before the server processes the service request), the SDRF, and specifically the MF 210, intercepts the service request en route to the server. From the service request, the MF identifies the service that is being requested. The service is available to be identified based on, for example, a destination network address of the service request (e.g. IP address, port number, URL, etc.).

At a next step 330, the SRI 230 receives, from the MF 210, the identity of the requested service. The SRI subsequently retrieves service requirement information associated with the identified requested service.

Service requirement information comprises rules that impose requirements upon the client device requesting that service (including the inherent characteristics of the device and/or the network connection established between the client device and the server), which the client device must meet in order for the server 140 to fulfil the requested service for the client device. In one example, the service requirement information is provided to, and stored at, the SRI by the server, which is therefore in communication with the SRI.

For example, the service requirement information is available to require that only certain types of client devices may utilise a given service, communications comply with a particular protocol or format, require a minimum level of security, and/or a minimum quality of service of the network connection. In a more detailed example, for a service provided by the server to store CCTV security footage (e.g. where the client device is a network-enabled CCTV camera), the service requirement information is available to require that the client device 110 must: communicate using a TCP protocol; and be connected to the server 140 via a secure connection using TLS and having a bandwidth of at least 2 Mbits/s. The SRI maintains a list of service requirement information for the services provided by the (or other) server(s).

At a subsequent step 340, the SDRF, and specifically the CDII, identifies the client device, for example based on a network address, device identity and/or subscriber identity associated with the client device, as derived by the MF 210 monitoring network communications from the client device.

In dependence on the identity of the client device, the CDII retrieves pre-determined client device information associated with the client device 110. The client device information provides information as to the characteristics of the client device.

The client device information is available to comprise:
pre-defined client device information, as provided by an operator, manufacturer and/or vendor of the client device. In particular, the pre-defined client device information is static. The pre-defined client device information is provided by the client device itself, and is for example in the form of a Manufacturer Usage Description (MUD) file, as typically retrieved from a network resource accessible to the wide area network 100, for example on the Internet via a URL provided by, or associated with the identified client device, or by inspecting DHCP traffic associated with the client device; and/or
observed client device information, representing a dynamic behaviour profile for the client device, as compiled by the CDII 240 based on analysis of network communications between the client device and the telecommunications network 100, as intercepted by the MF 210 and forwarded to the CDII. For example, the observed client device information is available to include:
temporal network interaction information, such as frequency and/or timings of network communications;
geographic information based on network address geo-location;
network usage information, such as volume of network traffic (uplink and/or downlink) and bandwidth usage;
network communication information, including types network communication protocol (e.g. TCP, UDP) and security protocol (e.g. TLS) used, as well as network communication content, such as data type and/or packet content;
network service requests, including identities of historically-requested network services; and/or
network connection information, including type of access connection used (e.g. wireless local area network, cellular network, hybrid access, etc.).

In this way, the CDII is available to store client device information for the client device that represents an expected behaviour of the client device based on trusted pre-defined information (which may lack granular detail) and observed information (which, although more detailed, might not be trustworthy or yet complete).

In a subsequent step 350, the client device information and the service requirement information are communicated by the CDII and SRI respectively to the processor 220. At the processor 220, a comparison is performed so as to assess whether the client device information fulfils the service requirement information 360 for the requested service.

If at step 360 the processor 220 determines compliance between the client device information and the service requirement information, the processor permits the service request 370 from the client device to proceed to the server so that it may be performed by said server. This is available to be performed by the processor retrieving the service request from the MF and then instructing the service orchestrator to communicate said service request to the server.

If, however, at step 360 the processor 220 determines non-compliance between the client device information and the service requirement information, the processor prevents the service request from being performed by the server 380, for example by preventing onward communication of the service request to the server.

In response to arriving at step 380, the SDRF is configured to identify a reconfiguration for the client device and/or its network connection (including any entity through which the network connection is established between the client device and the server) that will subsequently render the client device compliant with the service requirement information.

To do so, the processor is available to identify where the client device information is deficient in comparison to the service requirement information, and then to identify a specific reconfiguration in order to render compliance. For example, the processor is configured to generate a routing policy for the client device that routes traffic via a firewall, where the service requirement information requires routing via a firewall.

Reconfiguration that the processor 220 is available to identify (and subsequently instruct) include:
- updating and/or installing a new service and/or software, including a VPN, proxy, DHCP, for example at the client device, AP or the network 100;
- enforcing a security policy, such as an encryption policy;
- modifying a routing policy for the client device, for example to route via a particular network entity, including a firewall; and
- modifying a network connection with the client device, such as changing an access network for the client device.

At a next step 390, having identified a reconfiguration, the reconfiguration is communicated by the processor to the service orchestrator 250, which in turns communicates the reconfiguration as an instruction to perform said reconfiguration to the appropriate target entities, for example to the client device 110 and/or the AP 120.

Once the network reconfiguration has been implemented, process 200 is available to re-iterate from step 390 to step 340, thereby to update the client device information, having been updated following the network reconfiguration, and then to re-assess compliance with the service requirement information.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A computer-implemented method of operating a telecommunications network, the telecommunications network comprising a client device, a server, and an edge device connecting the client device to the server, the method being performed by the edge device and comprising:
   - intercepting a service request from the client device en route to the server, said service request requesting a service from the server;
   - identifying client device characteristic information associated with the client device;
   - identifying service requirement information associated with the requested service;
   - comparing the identified client device characteristic information with the identified service requirement information so as to determine if the client device characteristic information complies with the service requirement information; and
   - in response to determining that the client device information:
     - complies with the service requirement information:
       - permitting the server to provide the requested service in accordance with the service request; and
     - does not comply with the service requirement information:
       - preventing the server from providing the requested service in accordance with the service request; and
       - in response to the preventing:
         - identifying a characteristic of the client device characteristic information that is non-compliant with the service requirement information;
         - identifying a reconfiguration for modifying a network connection between the client device and the server to render the characteristic compliant with the requirement information, wherein the reconfiguration comprises re-routing, to a new network path between the client device and the server, communications associated with the client device; and
         - implementing the identified reconfiguration.

2. A method according to claim 1, wherein the client device characteristic information comprises pre-defined information provided by the client device.

3. A method according to claim 2, wherein the pre-defined information is contained in a Manufacturer Usage Description file.

4. A method according to claim 1, wherein identifying the client device characteristic information further comprises:
   - monitoring network communications with the client device;
   - compiling a behaviour profile for the client device in dependence on said network communications, wherein the client device characteristic information comprises the behaviour profile.

5. A method according to claim 1, wherein the client device characteristic information comprises a classification of the type of client device.

6. A method according to claim 1, wherein the client device characteristic information comprises a classification of the type of data generated by the client device.

7. A method according to claim 1, wherein the client device characteristic information comprises network connection characteristics of the client device.

8. A method according to claim 1, wherein the service requirement information is a rule requiring specific client device characteristic information of the client device.

9. A method according to claim 1, wherein the reconfiguration comprises implementing a security policy.

10. A method according to claim 1, wherein the reconfiguration comprises modifying the client device.

11. A non-transitory computer-readable carrier medium comprising a computer program, which, when the computer program is executed by a computer, causes the computer to perform steps of claim 1.

12. A telecommunications network for a client device, the telecommunications network comprising:
    - a server, to which the client device is connected via an access point;
    - a receiver configured to receive a service request from the client device, said service request requesting a service from the server;
    - a processor configured to:
      - identify client device characteristic information associated with the client device;
      - identify service requirement information associated with the requested service;
      - compare the identified client device characteristic information with the identified service requirement information so as to determine if the client device characteristic information complies with the service requirement information; and
      - in response to a determination that the client device information:
        - complies with the service requirement information:
          - permit the server from providing the requested service in accordance with the service request; and
        - does not comply with the service requirement information:
          - prevent the server from providing the requested service in accordance with the service request;

in response to the preventing:
> identify a characteristic of the client device characteristic information that is non-compliant with the service requirement information;
> identify a reconfiguration for modifying a network connection between the client device and the server to render the characteristic compliant with the requirement information, wherein the reconfiguration comprises re-routing, to a new network path between the client device and the server, communications associated with the client device; and implement the identified reconfiguration.

13. The telecommunications network according to claim 12, wherein a modification of the network connection comprises changing a routing policy for the network communications associated with the client device, including routing to a firewall.

\* \* \* \* \*